(12) United States Patent  (10) Patent No.: US 8,365,309 B2
Ito  (45) Date of Patent: Jan. 29, 2013

(54) MEMORY DEVICE

(75) Inventor: Masafumi Ito, Aichi (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 1188 days.

(21) Appl. No.: 12/034,881

(22) Filed: Feb. 21, 2008

(65) Prior Publication Data

US 2008/0209510 A1 Aug. 28, 2008

(30) Foreign Application Priority Data

Feb. 26, 2007 (JP) ................................. 2007-045323

(51) Int. Cl.
G06F 21/00 (2006.01)

(52) U.S. Cl. ................................. 726/36; 726/20; 726/28

(58) Field of Classification Search .................... 726/20, 726/28, 34, 35, 36
See application file for complete search history.

(56) References Cited

U.S. PATENT DOCUMENTS

| | | | | |
|---|---|---|---|---|
| 4,831,595 A * | 5/1989 | Bone | .............................. | 365/229 |
| 5,768,147 A * | 6/1998 | Young | ............................. | 700/286 |
| 5,887,131 A * | 3/1999 | Angelo | ............................ | 726/20 |
| 6,035,406 A * | 3/2000 | Moussa et al. | .................. | 726/18 |
| 6,237,100 B1 * | 5/2001 | Cromer et al. | ................. | 713/300 |
| 6,360,326 B1 * | 3/2002 | Hiles | ................................ | 726/19 |
| 7,134,600 B2 | 11/2006 | Tomoeda et al. | | |
| 7,182,251 B2 | 2/2007 | Tomoeda et al. | | |
| 7,182,264 B2 | 2/2007 | Tomoeda et al. | | |
| 7,398,379 B1 * | 7/2008 | Wong | ................................ | 713/1 |
| 2001/0039199 A1 * | 11/2001 | Shinzaki | ........................ | 455/572 |
| 2002/0013940 A1 | 1/2002 | Tsukamoto et al. | | |
| 2002/0081097 A1 | 6/2002 | Matsubara et al. | | |
| 2005/0005131 A1 | 1/2005 | Yoshida et al. | | |
| 2006/0151617 A1 | 7/2006 | Masubuchi | | |
| 2006/0192020 A1 | 8/2006 | Tomoeda et al. | | |
| 2007/0123316 A1 * | 5/2007 | Little | .............................. | 455/573 |
| 2007/0216348 A1 | 9/2007 | Shionoiri et al. | | |
| 2007/0229279 A1 | 10/2007 | Yamazaki et al. | | |

FOREIGN PATENT DOCUMENTS

EP 1 235 219 A2 8/2002

(Continued)

OTHER PUBLICATIONS

Dietz, "Battery Authentication for Portable Power Supplies," Power Electronics Technology magazine, Apr. 2006 pp. 34-39.*

*Primary Examiner* — Kambiz Zand
*Assistant Examiner* — Michael Guirguis
(74) *Attorney, Agent, or Firm* — Husch Blackwell LLP

(57) ABSTRACT

A memory device that has a function used to continue or disrupt a supply of electric power used to retain data stored in a recording medium or a supply of operating electric power of a circuit used to read out data stored in a storage medium, using personal identification information is provided. When the recording medium is formed of a volatile memory, this memory device has a power supply used to manage a supply of electric power that is used for retention of the stored data using the personal identification information and to retain or erase stored data by continuation or disruption of a supply of electric power by use of the personal identification information.

28 Claims, 13 Drawing Sheets

FOREIGN PATENT DOCUMENTS

| | | |
|---|---|---|
| JP | 1-279493 | 11/1989 |
| JP | 4-326489 | 11/1992 |
| JP | 2001-319213 | 11/2001 |
| JP | 2002-32685 | 1/2002 |
| JP | 2002-196988 | 7/2002 |
| JP | 2002-366938 | 12/2002 |
| JP | 2004-234419 | 8/2004 |
| JP | 2004-310387 | 11/2004 |
| JP | 2005-11151 | 1/2005 |
| JP | 2005-202719 | 7/2005 |
| JP | 2006-190210 | 7/2006 |
| JP | 2007-4723 | 1/2007 |

* cited by examiner

MEMORY DEVICE

BACKGROUND OF THE INVENTION

1. Field of the Invention

The present invention relates to memory devices. More specifically, the invention relates to memory devices that are in the class of memory cards that are rewriteable.

2. Description of the Related Art

With the development of data terminal devices represented by cellular phones, the importance of memory devices by which different types of data are stored has been increasing. For memory devices, semiconductor memory, hard disks, and the like are used primarily. Data stored in data terminal devices includes not only textual data such as that of schedules and address files but also image data that is recorded by digital cameras, music data that is distributed through the Internet or the like, and other types of data. For these reasons, an increase in the capacity of memory devices used in data terminal devices is being promoted.

With improvements in the performance of data terminal devices, it has become easier for a user to comfortably carry large amounts of data, and convenience in daily life has been increasing. On the other hand, leaking of data stored in memory devices is becoming a problem. Because the type of data that can be input to a data terminal device has been diversified, if a memory device is lost, there is a risk of personal information being leaked to a third party. Furthermore, when a data terminal device is discarded, unless the data terminal device is physically destroyed, data stored in a memory device is left remaining, and there is a concern that the data will be disclosed to the public by a third party who has malicious intent.

Consequently, in order that data not be leaked to a third party, protection of the data using a personal identification number or the like is being considered. For example, devices in which a retry counter that records the number of failed attempts at password verification of a memory card is provided and data is compulsorily deleted when the number of failed attempts reaches a given number are known (referring to Patent Reference Document 1).

Patent Reference Document 1: Japanese Published Patent Application No. 2005-011151

SUMMARY OF THE INVENTION

However, even if attempts are made to ensure security using a personal identification number or the like, if the personal identification number is decoded, reading out of data stored in the memory device becomes possible. In addition, if some alternate means is developed, there is a risk of the data stored in the memory device being accessed directly and the data being read out.

Hence, one object of the present invention is the prevention of leaking of data from a memory device with which given data can be recorded by a user. Another object of the present invention is the prevention of unauthorized use of the memory device.

One aspect of the present invention is a memory device that has a function used to continue or disrupt a supply of electric power used to retain data stored in a recording medium or a supply of operating electric power of a circuit used to read out data stored in a storage medium, using personal identification information. When the recording medium is formed of a volatile memory, this memory device has a power supply used to manage a supply of electric power that is used for retention of the stored data and to retain or erase stored data by continuation or disruption of a supply of electric power by use of the personal identification information. Furthermore, when the recording medium is formed of a nonvolatile memory, this memory device has a power supply used to manage a supply of electric power that is needed for operation of a circuit that is used to read out the stored data using the personal identification information and to control the operation of the circuit by continuation or disruption of a supply of electric power by use of the personal identification information.

In the power supply, it is preferable that an accumulator be provided and charging of the accumulator be performed by a contact or contactless method. By adjustment of the capacity of the accumulator in the power supply for electric power used to retain data stored in the recording medium or electric power needed for operation of a circuit used to read out data stored in the recording medium, the memory device can be configured so that data stored in the recording medium can be used for a given period of time.

One aspect of the present invention is a memory device that has a recording medium including a volatile memory in at least a part thereof; a recording media controller used to control operations of writing, reading out, and erasing of data to the volatile memory; and a power supply used to supply electric power to retain data that is recorded in the volatile memory, where the power supply has an accumulator, an authenticator used to determine whether the accumulator is to be charged or not when personal identification information is input, and a charging circuit used to perform charging of the accumulator when authorization of the authenticator is obtained.

Another aspect of the present invention is a memory device that has a recording medium including a nonvolatile memory; a recording media controller used to control operations of writing, reading out, and erasing of data to the recording medium; and a power supply used to supply driving electric power to the recording media controller, where the power supply has an accumulator, an authenticator used to determine whether the accumulator is to be charged or not when personal identification information is input, and a charging circuit used to perform charging of the accumulator when authorization of the authenticator is obtained.

By provision of an accumulator that can be charged by use of personal identification information and by supply of electric power used to retain data stored in a volatile memory by the accumulator, leaking of data from the memory device can be prevented.

By provision of an accumulator that can be charged by use of personal identification information and by supply of electric power needed for operation of a recording media controller that is used to control operations of writing and reading out of the nonvolatile memory by the accumulator, leaking of data from the memory device can be prevented.

DETAILED DESCRIPTION OF THE INVENTION

Figure 1:
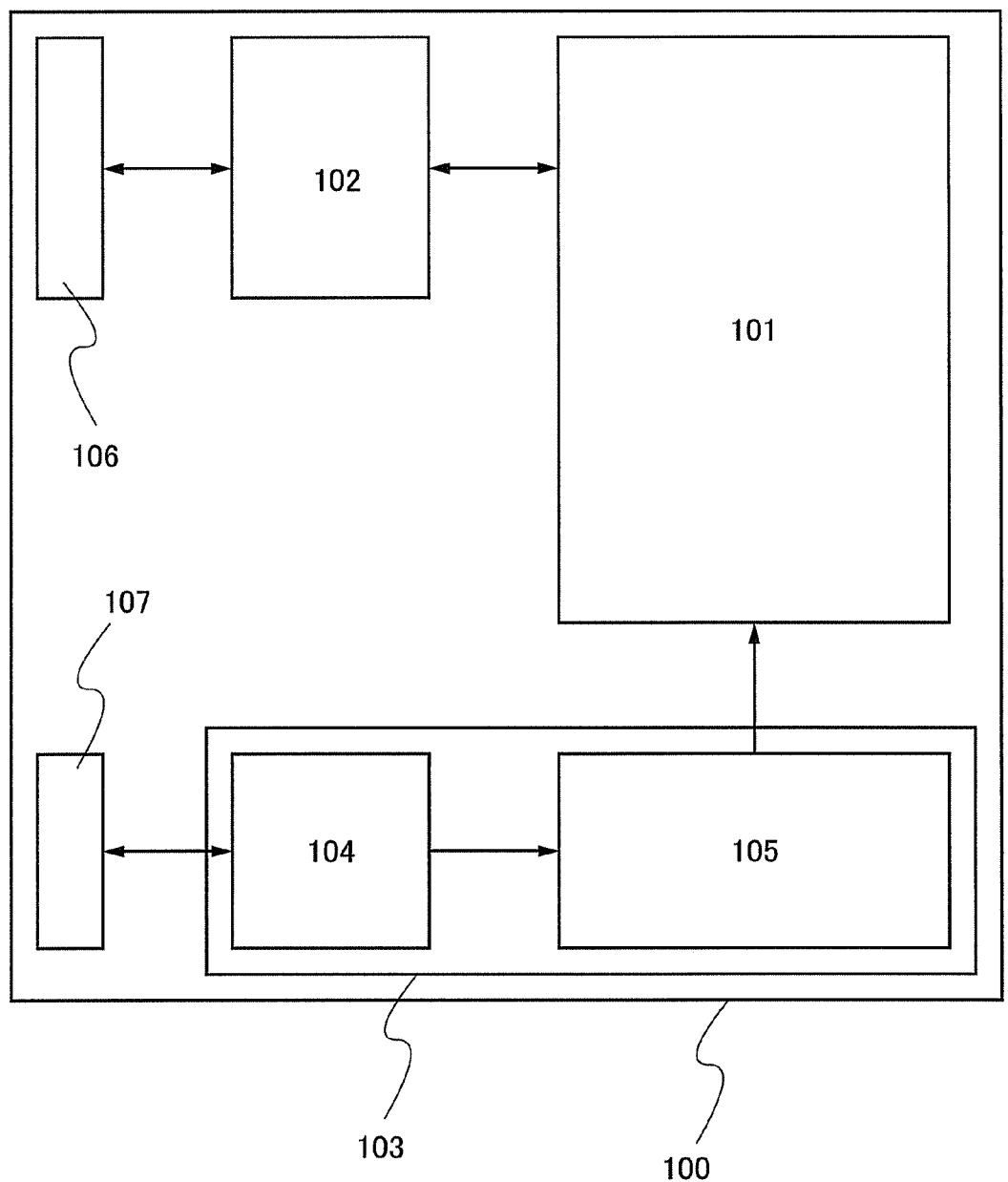
FIG. 1 is a diagram illustrating a first structure of a memory device that has a recording medium, a recording media controller, and a power supply.

Embodiment Modes of the present invention will be described hereinafter with reference to the accompanying drawings. However, the present invention is not limited to the description given hereinafter, and it is to be easily understood to those skilled in the art that various changes and modifications can be made without any departure from the spirit and scope of the present invention. Therefore, the present invention is not to be construed as being limited to the description of the embodiment modes given hereinafter. It is to be noted that, in structures of the present invention described below, the same reference numerals are used in common to denote the same components in different drawings.

The memory device of this invention has a recording medium used to store data; a recording media controller used to control operations of writing, reading out, and erasing of data of the recording medium; and a power supply. By organically mutual interaction between these components, a function used to protect personal data and the like of a user of the memory device is exhibited. First, a typical structure will be described with reference to drawings.

(First Structure)

In FIG. 1, a first structure of a memory device of the present embodiment mode is shown. A memory device 100 shown in FIG. 1 has a recording medium 101, a recording media controller 102, and a power supply 103. The recording medium 101 in the memory device 100 is formed of volatile memory or nonvolatile memory. For volatile memory, dynamic random access memory (dynamic RAM), static RAM, pseudo static RAM, or the like is applied. For nonvolatile memory, NAND flash memory or NOR flash memory formed of floating gate memory transistors or charge-trap memory transistors is applied. In addition, hard disk memory can also be applied for nonvolatile memory.

The recording medium 101 is configured so that given data can be written by a user and that data can be read out. Control of writing of data to the recording medium 101, reading out of data from the recording medium 101, and erasing of data recorded to the recording medium 101 is performed by the recording media controller 102. Written data control commands and the like from an input/output 106 are input to the recording media controller 102, and read-out data is output to the input/output 106 from the recording medium 101 via the recording media controller 102.

Control commands for the memory device 100 and data written to the recording medium 101 are input to the input/output 106. When the memory device 100 is set to be a contactless type of memory device, an antenna circuit used to receive wireless signals, a resonance circuit, and the like are included in the structure of the input/output 106. In the recording media controller 102, a modulator circuit and a demodulator circuit are provided, and data is input and output by wireless communication. It is to be noted that, when data is not input and output by wireless communication, a contact-type input terminal may be provided for the structure of the input/output 106, and an impedance matching circuit, a protective circuit, or the like may be provided as appropriate.

The power supply 103 is formed of a charging controller 104 and an accumulator 105. The charging controller 104 is a circuit used to rectify alternating current waves transmitted from an input/output 107 and to charge the accumulator 105. Electromagnetic waves of frequencies from 100 Hz to 50 GHz can be adapted for use as the alternating current waves. For example, an antenna used for reception of signals may be provided in the input/output 107 so that electromagnetic waves of frequencies in the radio frequency band of from 30 kHz to 30 GHz can be received. Supply of electric power can be performed wirelessly by use of a charger that transmits electromagnetic waves to the memory device 100. Additionally, the accumulator 105 may be charged via the charging controller 104 by random reception of electromagnetic waves that propagate through the air. It is to be noted that a contact-type input terminal may be provided for the structure of the input/output 107.

The accumulator 105 is formed of a rechargeable battery (a chemical cell that can be used repeatedly by accumulation of electricity by charging) such as a rechargeable lithium-ion battery, a rechargeable lithium-ion polymer battery, a nickel-hydride storage battery, a nickel-cadmium storage battery, or the like; a capacitor; or the like. The accumulator 105 supplies electric power required for operation of the recording medium 101. The accumulator 105 is configured so as to supply electric power required for operation of a driver circuit in a memory cell array of the recording medium 101. In this case, with loss of electric power of the accumulator 105, operation of the recording medium 101 stops, and writing and reading out of data becomes unable to be performed. Alternatively, the accumulator 105 is configured so as to supply electric power used to retain data that is written to a memory cell of a volatile memory cell array. In this case, with loss of electric power of the accumulator 105, because data stored in the recording medium 101 is lost, as well, reading out of data becomes unable to be performed.

In the present example of a structure, in cases where given personal identification information is authenticated, a charging controller unit can be provided in the charging controller 104 so that the accumulator 105 is placed in an operating state. Because operation of the recording medium 101 by supply of electric power of the accumulator 105 becomes possible, by provision of a charging controller unit used to grant permission for charging by authentication data in the charging controller 104, data stored in the recording medium 101 becomes unable to be used by a third-party that has not been given permission to access the data.

By the present example of a structure, by management of electric power of the accumulator 105 using identification information or the like, the structure can be set so that only a specific user can use the data recorded in the recording medium 101. In consideration of power consumption by the recording medium 101, because the length of useable time for one full charge can be set based on the capacity of the accumulator 105, the amount of risk of leaking of data from the memory device 100 can be reduced. Furthermore, by the capacity of the accumulator 105 being set or the electric power used to charge the accumulator 105 being adjusted in consideration of the power consumption by the recording medium 101, the length of time that the memory device 100 can be used can be set.

(Second Structure)

Figure 2:
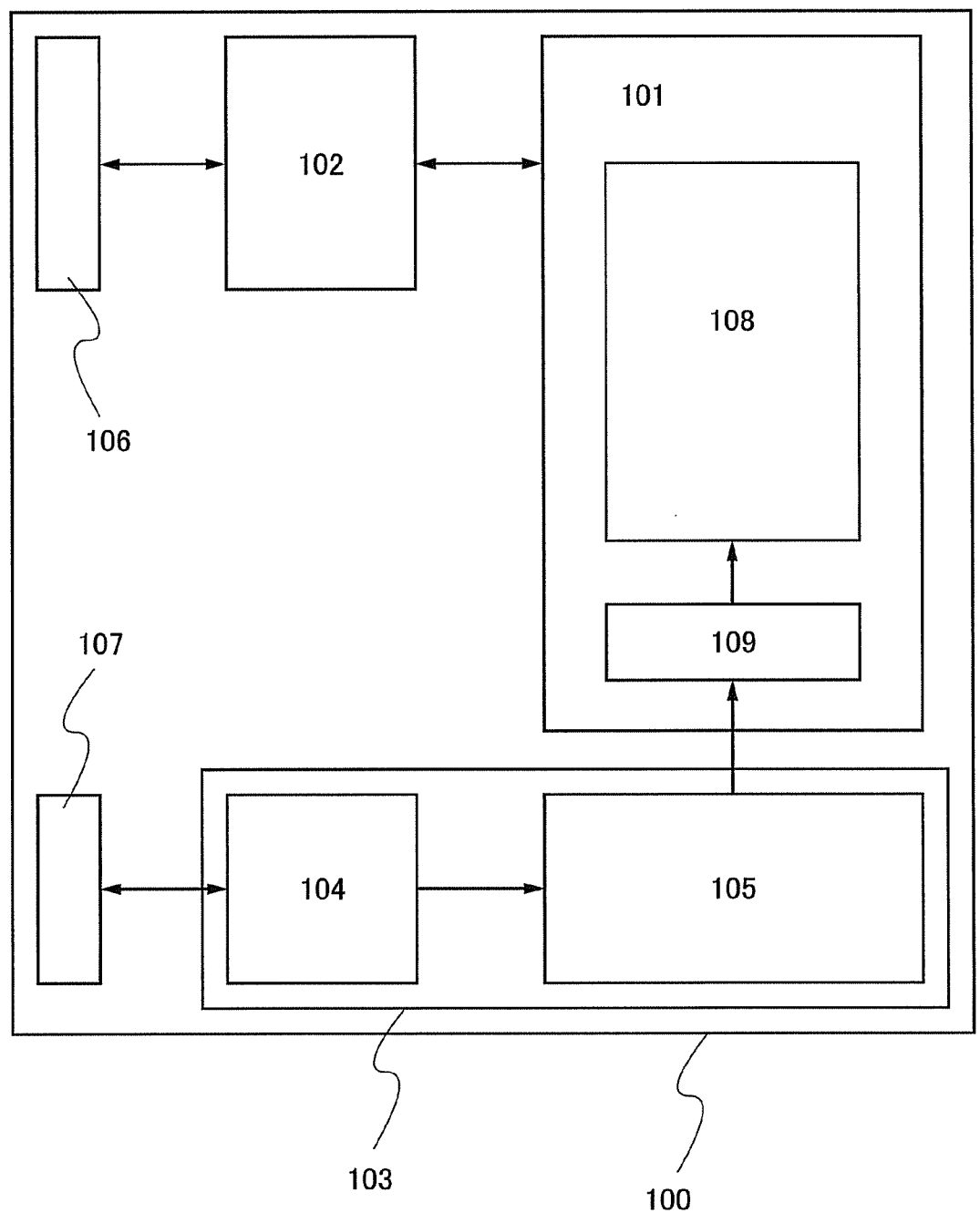
FIG. 2 is a diagram illustrating a second structure of a memory device that has a recording medium, a recording media controller, and a power supply.

In FIG. 2, a second structure of a memory device of the present embodiment mode is shown. The memory device 100 shown in FIG. 2 has the recording medium 101, the recording media controller 102, and the power supply 103. The recording medium 101 is structured so that a volatile memory 108 is included in a part of the recording medium 101. For typical examples of volatile memory, semiconductor memory is applied; for example, dynamic RAM, static RAM, pseudo static RAM, or the like is applied. An auxiliary power supply 109 is connected to the volatile memory 108. The auxiliary power supply 109 is used to supply electric power for retention of data that is written to the volatile memory 108. For example, the auxiliary power supply 109 is used for retention of data that is written to a memory cell of static RAM. For dynamic RAM, the auxiliary power supply 109 is used for refresh operations.

The electric power of this auxiliary power supply 109 is supplied from the accumulator 105 in the power supply 103. The structure of the power supply 103 is the same as that of the first structure that is described using FIG. 1. Furthermore, for the recording media controller 102, the input/output 106, and the input/output 107, the same as those used in the first structure can be applied.

By the present structure, highly confidential data can be recorded to the volatile memory 108 in the recording medium 101, and usage of this data can be managed using the power supply 103. In the recording medium 101, regions of memory other than the volatile memory 108 may be formed of nonvolatile memory or read-only memory, and the regions of memory may be configured so that reading can be done at random.

In this way, by management of the electric power of the accumulator 105 using identification information or the like, the structure can be configured so that only a specific user can use the data recorded in the volatile memory 108. Because the data written to the volatile memory 108 is lost if the supply of electric power from the auxiliary power supply 109 is stopped, deciphering of the data by a third party at a later time becomes unable to be done. In consideration of power consumption of the volatile memory 108, because the length of useable time for one full charge can be set based on the capacity of the accumulator 105, the amount of risk of leaking of data from the memory device 100 can be reduced. Furthermore, by the capacity of the accumulator 105 being set or the electric power used to charge the accumulator 105 being adjusted in consideration of the power consumption by the volatile memory 108, the length of time that memory is retained can be set.

(Third Structure)

Figure 3:
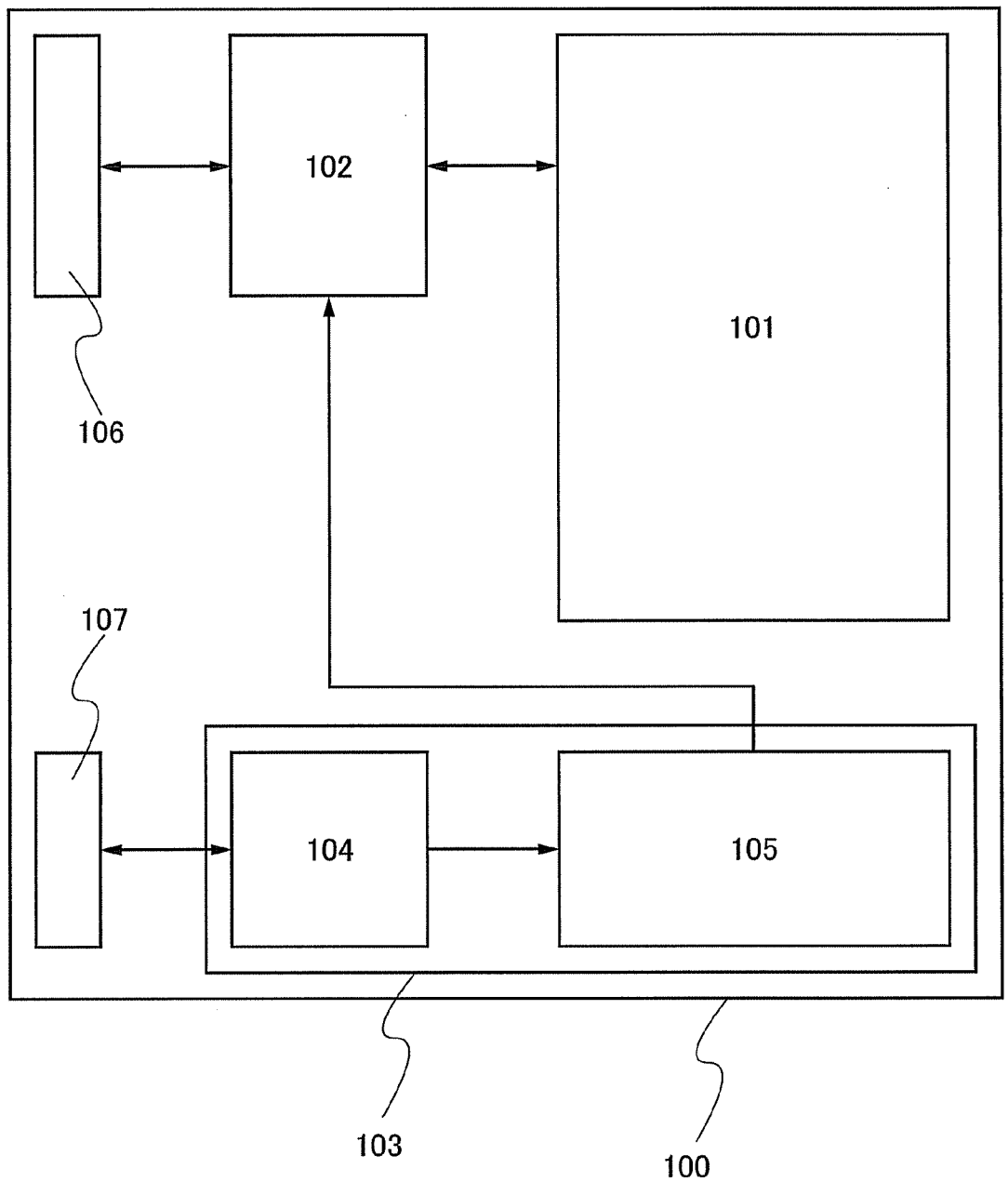
FIG. 3 is a diagram illustrating a third structure of a memory device that has a recording medium, a recording media controller, and a power supply.

In FIG. 3, a third structure of a memory device of the present embodiment mode is shown. The memory device 100 shown in FIG. 3 has the recording medium 101, the recording media controller 102, and the power supply 103. The recording medium 101 is the same as that of the first structure that is described using FIG. 1. In the present structure, the structure is one in which driving electric power for the recording media controller 102 is supplied from the accumulator 105. If the supply of electric power from the accumulator 105 is stopped, data from the recording medium 101 becomes unable to be read. The structure of the power supply 103 is the same as that of the first structure, and by management of charging of the accumulator 105 by the identification information, data stored in the medium device 100 can be managed.

By the present example of a structure, by management of the electric power of the accumulator 105 using identification information or the like, the structure can be configured so that only a specific user can use the data that is stored in the recording medium 101. By the capacity of the accumulator 105 being set to an appropriate amount in consideration of the power consumption of the recording media controller 102, the period of time during which data can be read out from the memory device 100 can be set, as well.

(Structure of a Power Supply)

In the first structure, the second structure, and the third structure in the memory device of the present embodiment mode, the charging controller 104 that can be applied in common will be described with reference to FIG. 4, FIG. 5, and FIG. 6.

Figure 4:
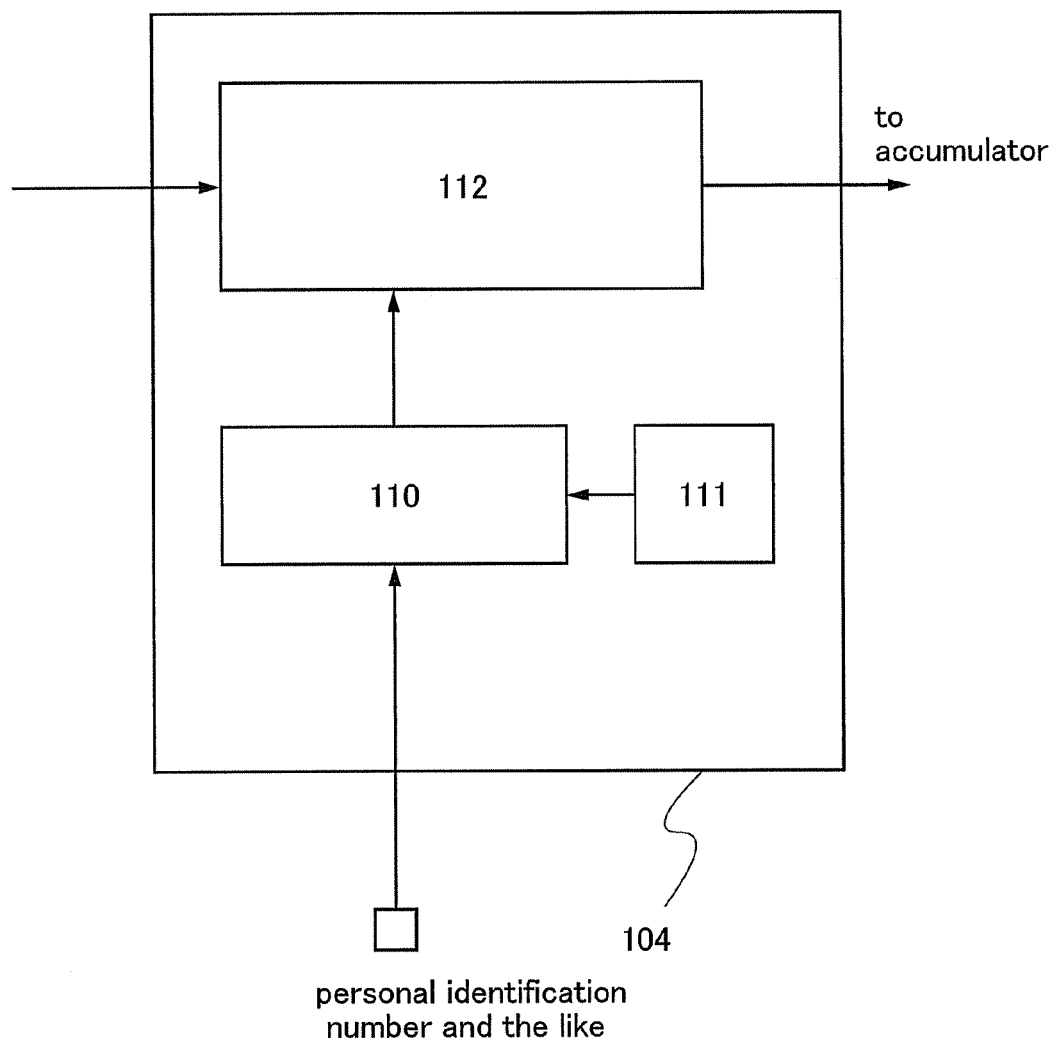
FIG. 4 is a diagram illustrating a first structure of a charging controller that is included in a power supply in a memory device.

In FIG. 4, a structure of the charging controller 104 used to perform management of charging using a personal identification number is shown. The personal identification number is input along with control commands for the memory device 100 from the recording media controller 102 to an authenticator 110. If authentication of authorization of charging is obtained in the authenticator 110, a signal that authorizes charging is output to a charging circuit 112. The charging circuit 112 performs charging operations when a signal authorizing charging is input thereto. A memory unit 111 in which identification information is stored in advance may be provided in the charging controller 104 and set so that a comparison of an input personal identification number and the identification information is carried out by the authenticator 110.

Figure 5:
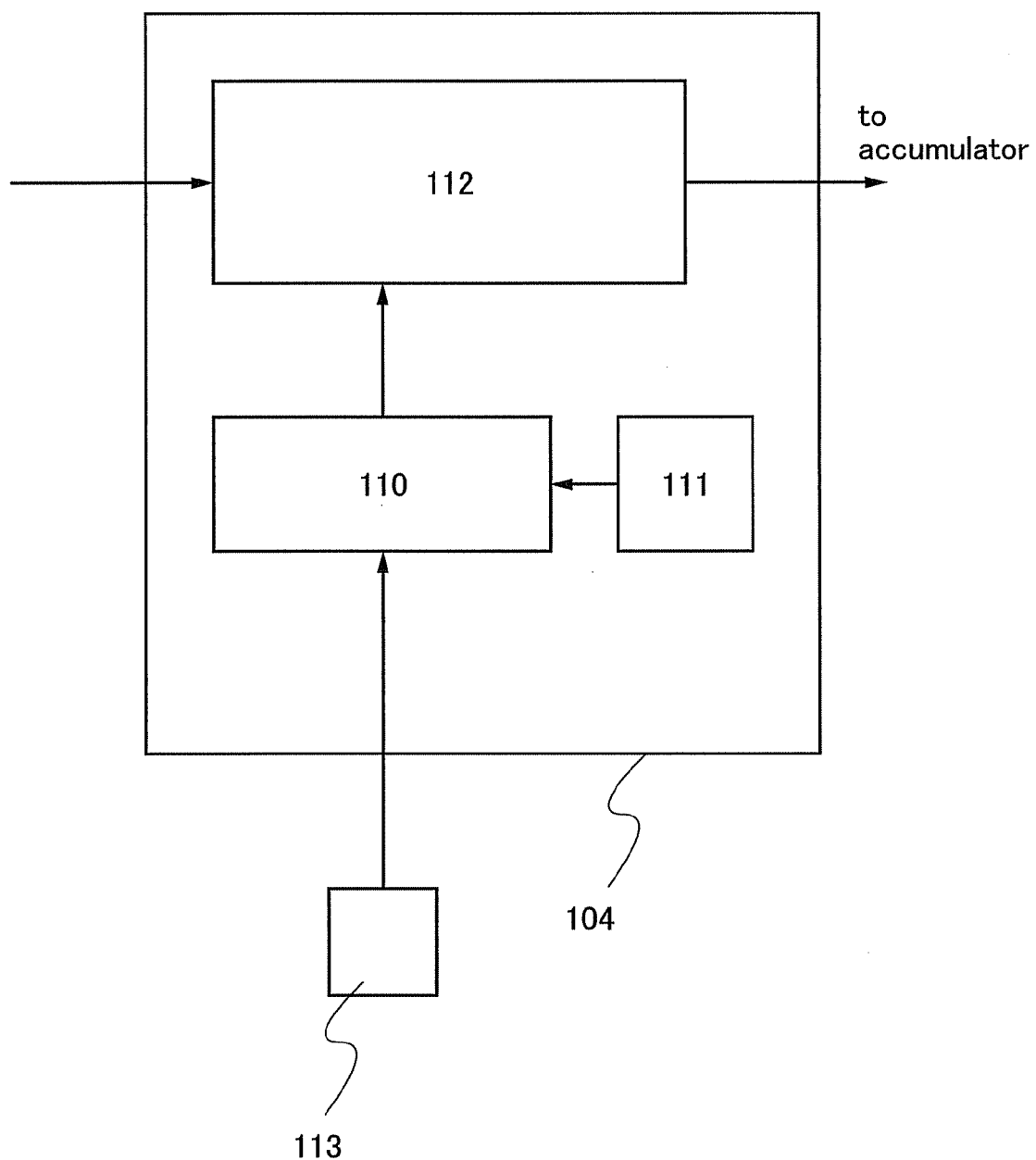
FIG. 5 is a diagram illustrating a second structure of a charging controller that is included in a power supply in a memory device.

In FIG. 5, a structure is shown in which a sensor unit 113 (a biometric data sensor) that is used to distinguish between different sets of biometric data in the memory device is provided and the output signal of the sensor (sensor signal) is input to the authenticator 110. For the sensor unit 113, a fingerprint sensor, a retinal sensor, a facial image sensor, or the like is employed, and data about the characteristics of an individual is recognized by the sensor unit 113. The data about the individual may be recorded in the memory unit 111 in advance and set so that an output signal from the sensor unit 113 is analyzed by arithmetic processing and authenticated by the authenticator 110.

Figure 6:
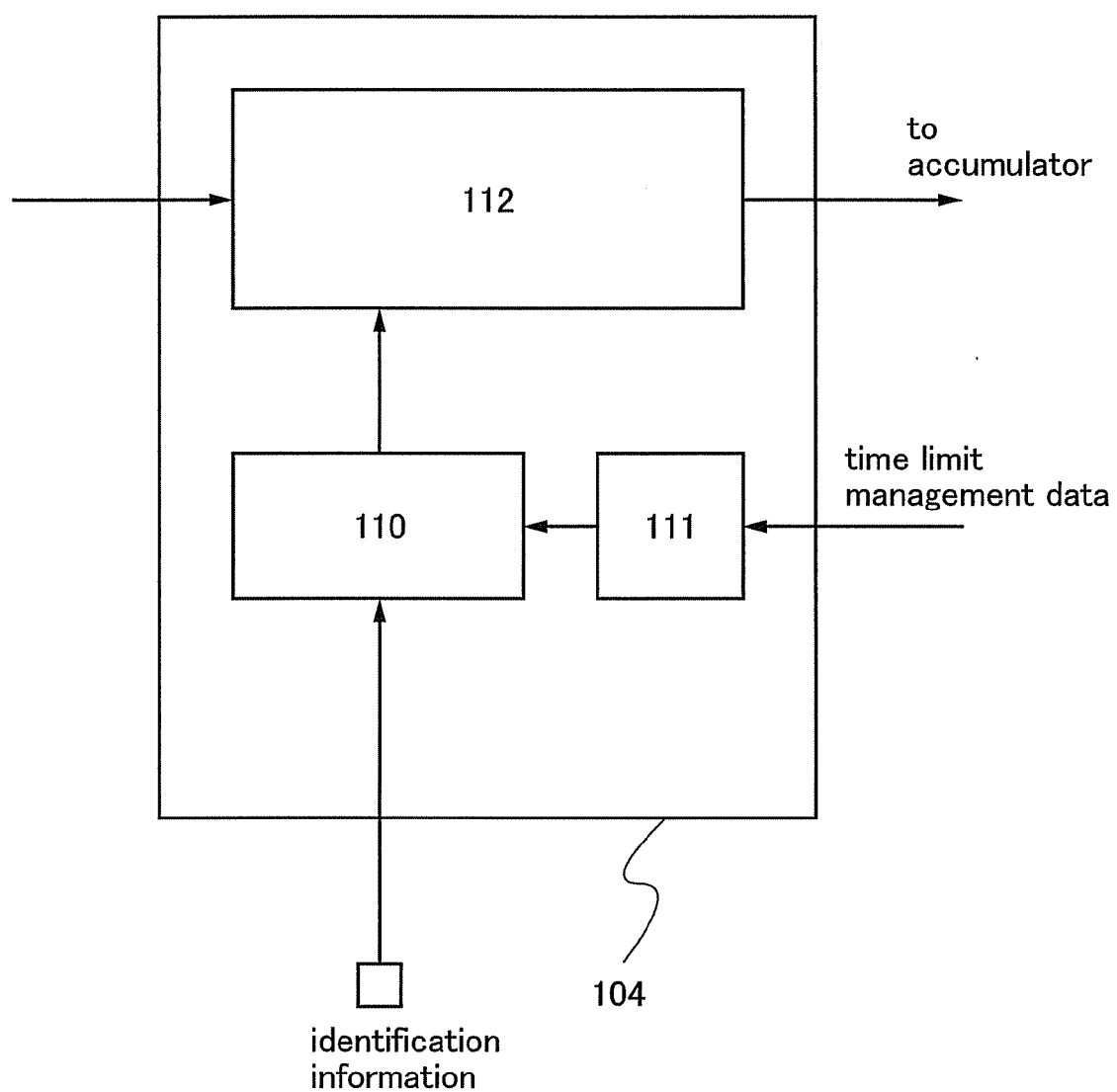
FIG. 6 is a diagram illustrating a third structure of a charging controller that is included in a power supply in a memory device.

In FIG. 6, a structure is shown in which data about the length of time during which the charging circuit 112 can be made to operate is stored in the memory unit 111. This data about the length of time (time limit management data) is input along with control commands for the memory device 100 from the recording media controller 102 and recorded in the memory unit 111. The identification information input to the authenticator 110 may be a personal identification number as shown in FIG. 4 or an output signal from the sensor unit 113 that is used to differentiate between individuals as shown in FIG. 5. In the authenticator 110, by arithmetic processing of the time limit management data and the identification information, data about a memory device in which the period of time during which data is available is limited can be provided to a user.

(First Example of the Structure of a Recording Medium)

Figure 7:
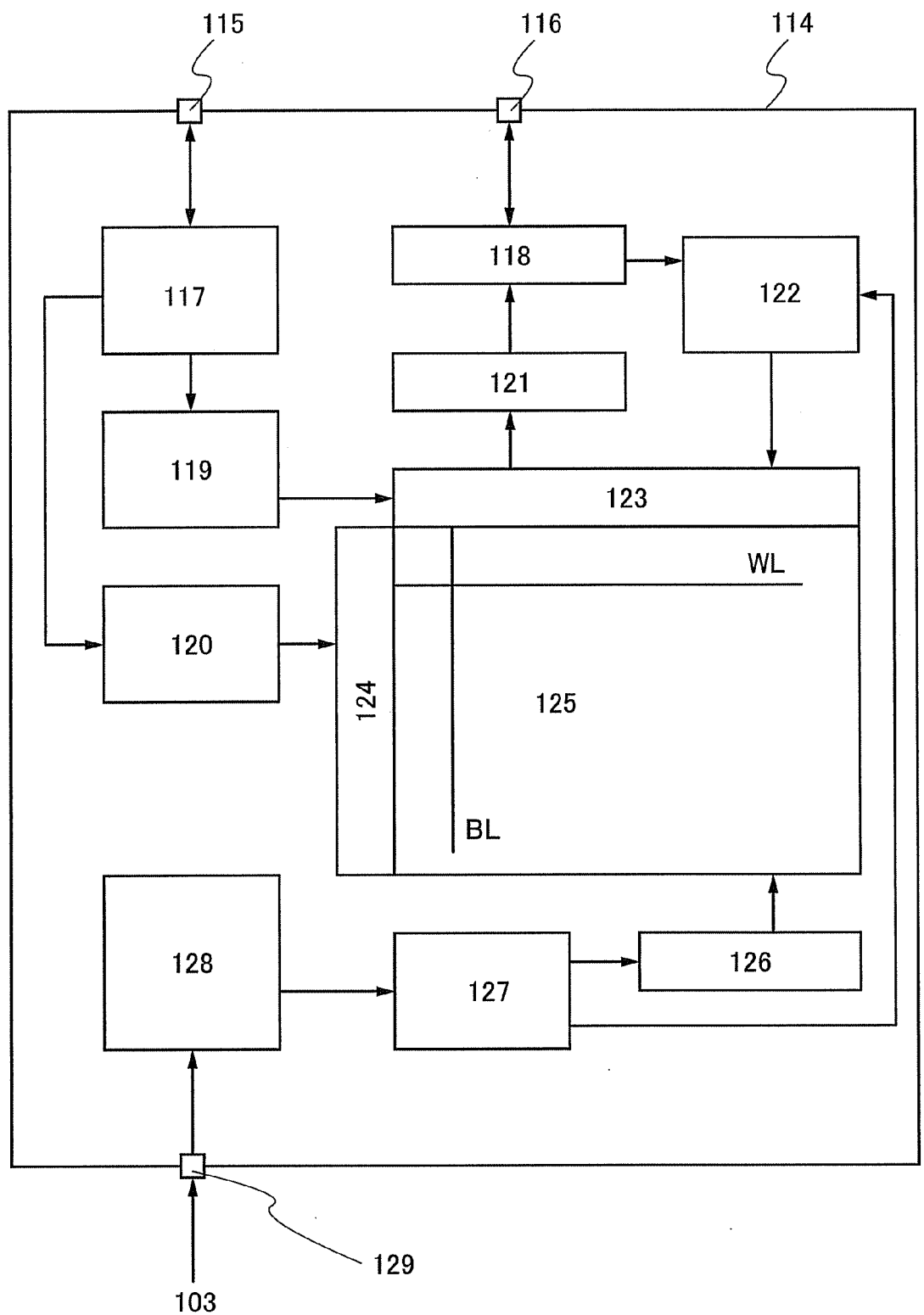
FIG. 7 is a diagram illustrating a structure of nonvolatile memory that is given as one example of a recording medium.

In FIG. 7, a structure of nonvolatile memory is shown as an example of a recording medium that can be applied in the present embodiment mode. In FIG. 7, a block diagram is shown for a structure of flash memory as an example of nonvolatile memory.

In the nonvolatile memory 114, terminals for each of a command input/output port 115, a data input/output port 116, and a power supply input port 129 are provided. Commands for control of operations of the nonvolatile memory 114 are input to the command input/output port 115. For the control commands, there are writing commands, reading commands, erasing commands, and the like. Along with these control commands, data designating addresses of a nonvolatile memory cell array 125 is input and output via the command input/output port 115. The control commands and the data designating addresses are processed by the command control circuit 117, and address commands are output to a column address decoder 119 and a row address decoder 120. The column address decoder 119 decodes column address commands and outputs a signal or the like that designates a bit line address to a column decoder 123. The row address decoder 120 decodes row address commands and outputs a signal or the like that designates a word line address to a row decoder 124.

The nonvolatile memory cell array 125 is formed of memory transistors, which have a floating gate or charge trap layer for a gate structure, that are arranged in matrix. Each of the memory transistors is selected by a bit line (BL) that extends from the column decoder 123 and a word line (WL) that extends from the row decoder 124, and data is input and output.

Data written to the nonvolatile memory cell array 125 is input from the data input/output port 116 and sent to a writing circuit 122 via an input/output buffer 118. The writing circuit 122 outputs data to the column decoder 123.

The data of the nonvolatile memory cell array 125 is read out from the column decoder 123 via a sense amplifier 121. Output of the sense amplifier 121 is sent to the input/output buffer 118 and transmitted through the data input/output port 116.

Electric power necessary for operation of the nonvolatile memory 114 is input from the power supply input port 129. The power supply input port 129 is connected to the power supply 103 shown in each of FIG. 1, FIG. 2, and FIG. 3. That is, the electric power of the accumulator 105 is supplied to the power supply circuit 128 via the power supply input port 129. The supplied electric power is stabilized by the power supply circuit 128 and supplied to each circuit. In cases where a high voltage is needed for writing and erasing of the nonvolatile memory cell array 125, electric power boosted by a booster circuit 127 is supplied to a writing circuit 122 and a well driver 126. The well driver 126 operates by synchronization with a block selection signal transmitted from the command control circuit 117. A desired voltage is applied to a well of a selected memory block. For example, the well driver 126 operates when bulk erasing is performed in block units.

As shown in FIG. 7, the nonvolatile memory 114 becomes able to operate by supply of electric power from the power supply 103. That is, operations of writing, reading out, and erasing of data can be controlled by management of the supply of electric power from the power supply 103. In this case, because the data stored by the nonvolatile memory 114 is retained, the structure shown in FIG. 7 is useful for cases in which it is desired that reading out and writing be prevented while data is retained. It is to be noted that the structure of the nonvolatile memory 114 shown in FIG. 7 can be applied as a component that forms all or part of the recording medium 101.

(Second Example of the Structure of a Recording Medium)

Figure 8:
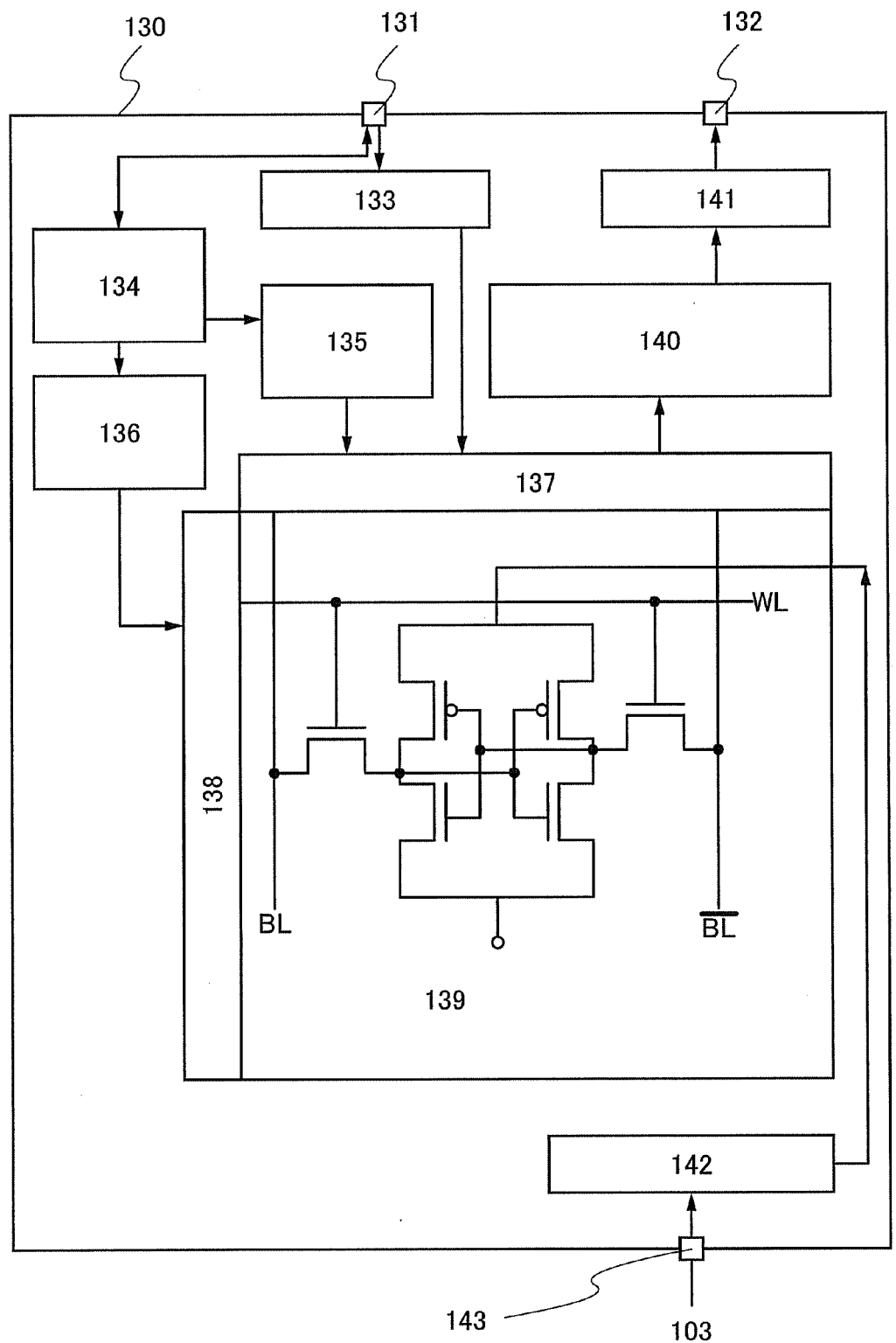
FIG. 8 is a diagram illustrating a structure of volatile memory that is given as one example of a recording medium.

In FIG. 8, a structure of a volatile memory is shown as an example of a recording medium that can be applied in the present embodiment mode. In FIG. 8, a block diagram is shown for a structure of static RAM as an example of volatile memory.

In a volatile memory 130, terminals for each of an input port 131, an output port 132, and a power supply input port 143 are provided. Commands for control of operations of the volatile memory 130 are input to the input port 131. For the control commands, there are writing commands, reading commands, erasing commands, and the like. Along with these control commands, data designating addresses of a volatile memory cell array 139 and data stored in the volatile memory cell array 139 are input from the input port 131. The control commands and the data designating the addresses are processed by a command control circuit 134, and address commands are output to a column address decoder 135 and a row address decoder 136. In addition, the stored data is output to an input buffer 133. The column address decoder 135 decodes column address commands and outputs a signal or the like that designates a bit line address to a column decoder 137. The row address decoder 136 decodes row address commands and outputs a signal or the like that designates a word line address to a row decoder 138.

Data written to the volatile memory cell array 139 is sent to the column decoder 137 from the input buffer 133 and written to a specified memory cell via a bit line. Selection of the memory cell is performed by synchronization of the column decoder 137 and the row decoder 138. The data of the volatile memory cell array 139 is read out from the column decoder 137 via a sense amplifier 140. Output of the sense amplifier 140 is sent to an output buffer 141 and transmitted through the output port 132.

The volatile memory cell array 139 has a structure of static RAM in which inverters are connected in a two-stage ring and either of two stable conditions, an H level (a high level) and an L level (a low level), can be retained. In addition, a selection transistor that is used to perform control of reading out and writing is connected to the bit line that extends from the column decoder 137. Because static RAM has a structure in which data is retained in inverters, data can continue to be retained while electric power required for retention is being supplied. If electric power required for retention of data comes to not be supplied, data retained up to the moment electric power stops being supplied is lost. Because the amount of power consumed comes to be only leak current from the inverters, static RAM can get by with less power consumption than dynamic RAM.

Electric power necessary for retention of memory of the volatile memory 130 is input from the power supply input port 143. The power supply input port 143 is connected to the power supply 103 shown in each of FIG. 1, FIG. 2, and FIG. 3. That is, the electric power of the accumulator 105 is supplied to an auxiliary power supply circuit 142 via the power supply input port 143. The supplied electric power is stabilized by the auxiliary power supply circuit 142 and supplied to the volatile memory cell array 139.

As shown in FIG. 8, the volatile memory 130 becomes able to retain or erase stored data by control of the supply of electric power from the power supply 103. That is, operations of writing, reading out, and erasing of data can be controlled by management of the supply of electric power from the power supply 103. In this case, because the data stored by the volatile memory 130 is erased if the supply of electric power stops, the structure shown in FIG. 8 is effective for cases in which it is desired that stored data not be left remaining. It is to be noted that static RAM is shown for the volatile memory 130 in FIG. 8; however, if the structure is configured so that operating electric power of a refresh circuit is supplied from the power supply 103, a structure of dynamic RAM, pseudo static RAM, or the like can be employed, as well.

Embodiment 1

Figure 9:
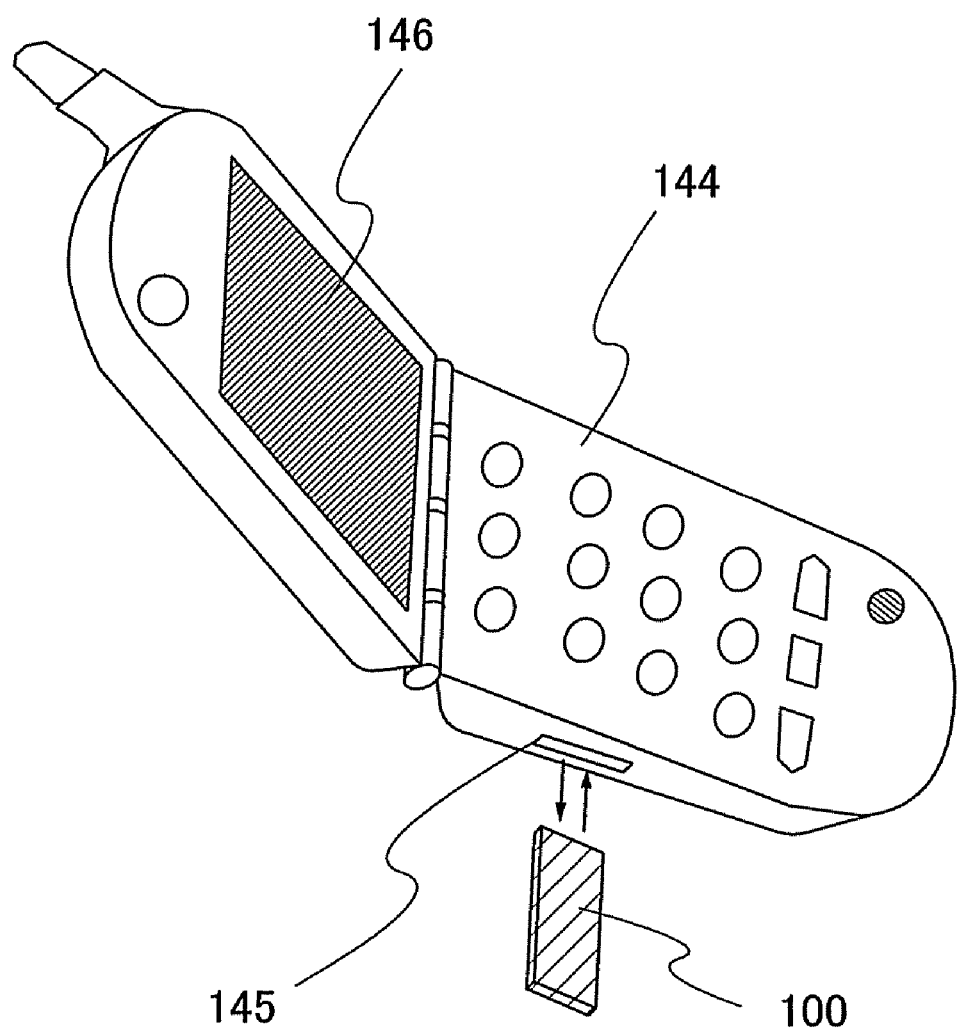
FIG. 9 is a diagram used to describe a cellular phone in which a memory device that is shown as an example in Embodiment 1 is used.

The memory device of the present invention can be used in combination with a variety of electronic devices. In FIG. 9, a case in which the memory device 100 of the present invention is applied to a cellular phone 144 is shown as an example. The cellular phone 144 is equipped with a memory slot 145 and has a structure in which the memory device 100 can be inserted into the memory slot 145. Data stored in the memory device 100 can be played back as audio or music data. Furthermore, data stored can also be displayed on a display panel 146 as image or video data or as textual data.

Figure 10:
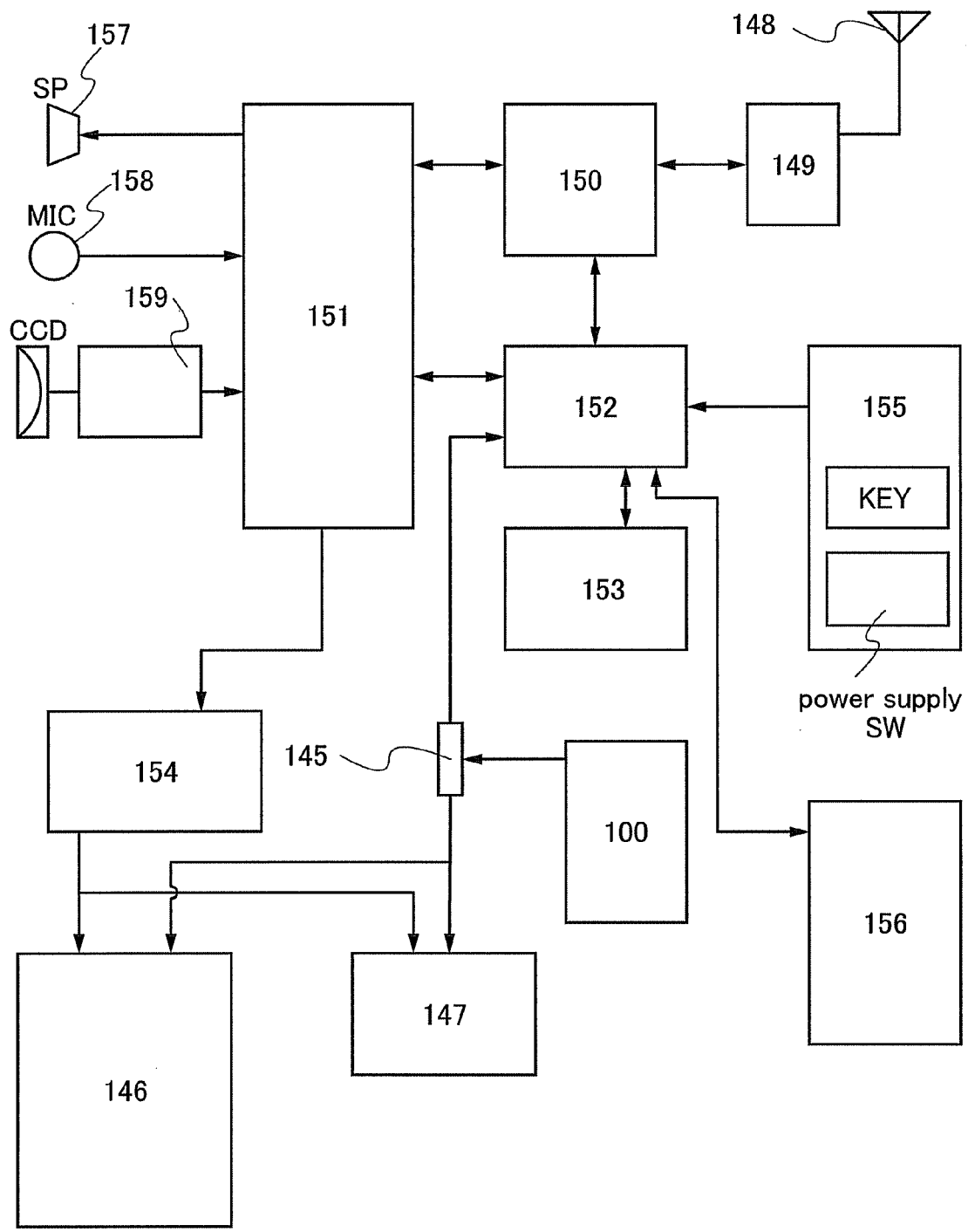
FIG. 10 is a diagram used to describe the structure of a cellular phone in which a memory device that is shown as an example in Embodiment 1 is used.

An example of the system structure of this kind of cellular phone 144 is shown in FIG. 10. An antenna 148, an RF circuit 149, and a baseband processor 150 are provided for wireless communication in the 700 MHz to 900 MHz band and the 1.7 GHz to 2.5 GHz band. An audio/image processing processor 151 communicates with a CPU 152 and sends video signals and the like to a video controller 154. Moreover, the audio/image processing processor 151 also performs processing and the like of audio output to a speaker 157, audio input from a microphone 158, and image data sent from a camera module 159. The CPU 152 operates according to an operating program stored in a main memory 153, receives signals from an input 155, and performs control of the audio/image processing processor 151. In addition, the CPU 152 controls communications performed using a local area network via a communications interface 156 (an input/output IF). The video controller 154 performs control of a display panel 146 and a sub display panel 147.

Data of the memory device 100 that is inserted into the memory slot 145 is sent to the CPU 152. When the data of the memory device 100 is audio data (or music data), the audio data (or music data) is played back from the speaker 157. When image or video data is included in the data of the memory device 100, the images or video is displayed on either the display panel 146 or the sub display panel 147 or on both. A power supply required for operation of the memory device 100 is a separate system from this cellular phone 144. That is, the power supply used to manage stored data of the memory device 100 shown in FIG. 1, FIG. 2, and FIG. 3 is provided in the memory device 100 as an independent power supply. For this reason, stored data of the memory device 100 becomes able to be managed independently from the cellular phone 144. By the structure being set to be this kind of structure, even if, for example, the cellular phone 144 is lost and later comes into the possession of a third party who has malicious intent, data stored in the memory device 100 can be prevented from being used.

Embodiment 2

Figure 11:
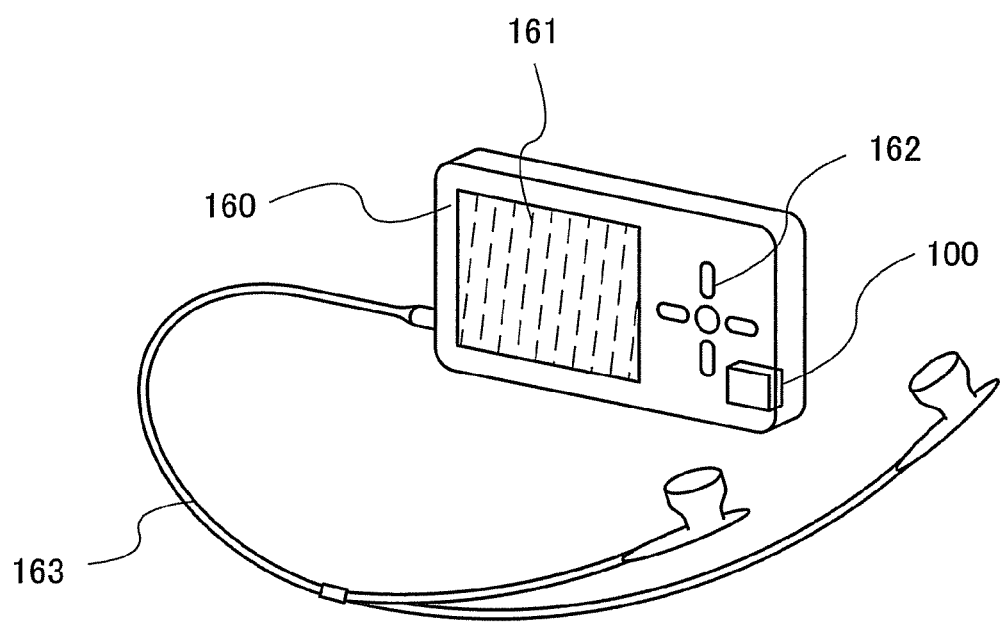
FIG. 11 is a diagram used to describe a digital player in which a memory device that is shown as an example in Embodiment 2 is used.

The memory device of the present invention can be used in combination with a variety of electronic devices. In FIG. 11, a digital player 160 (a digital audio player), which is a typical example of an audio device, is shown. The digital player 160 includes a display panel 161, an operation section 162, earphones 163, and the like. It is to be noted that headphones or wireless earphones can be used instead of the earphones 163. Either music data or image or video data or both music data and image or video data that are to be played back by the digital player 160 is stored in the memory device 100. The memory device 100 can be detached from the digital player 160. That is, the memory device 100 is removable. In this case, a power supply required for operation of the memory device 100 is supplied by a separate system from this digital player 160. That is, the power supply used to manage stored data of the memory device 100 shown in FIG. 1, FIG. 2, and FIG. 3 is provided in the memory device 100 as an independent power supply. For this reason, stored data of the memory device 100 becomes able to be managed independently from the digital player 160.

Figure 12:
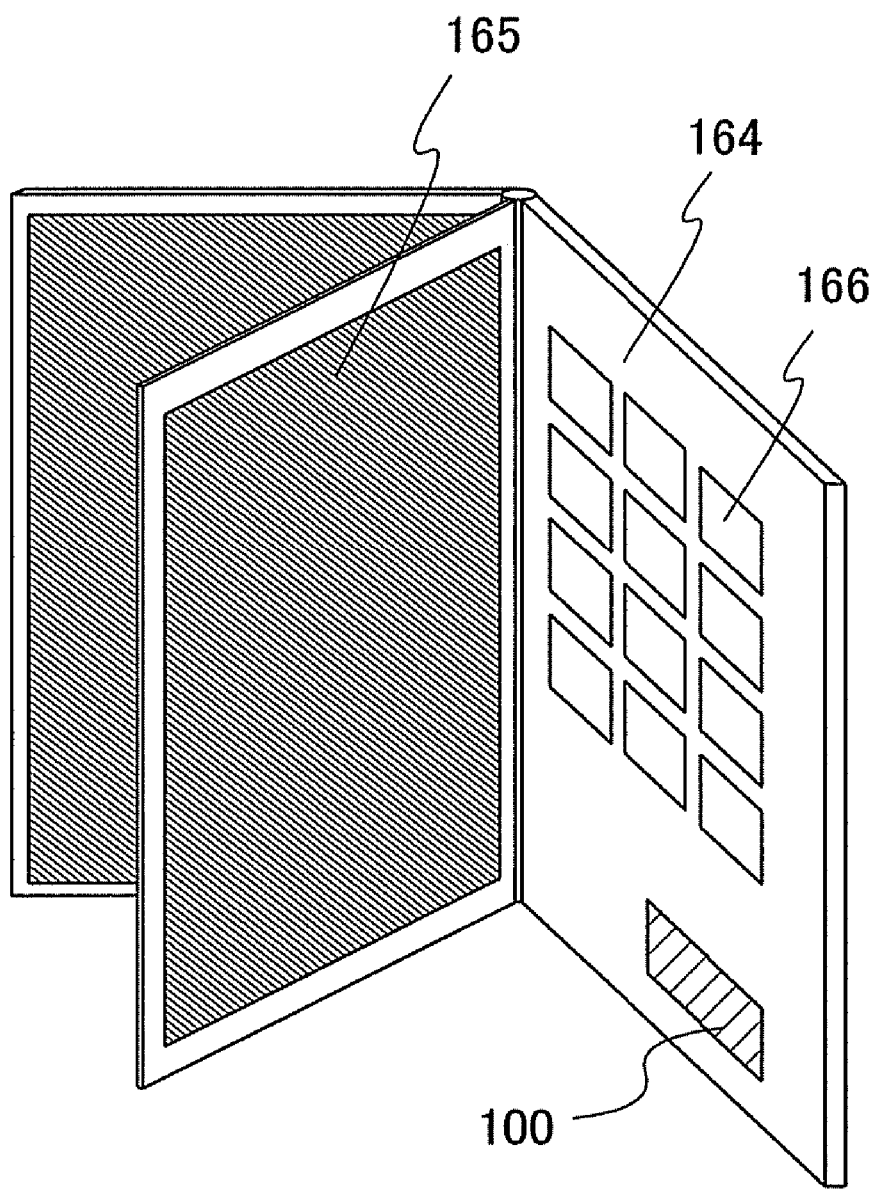
FIG. 12 is a diagram used to describe an electronic book reader in which a memory device that is shown as an example in Embodiment 2 is used.

Furthermore, in FIG. 12, an electronic book reader 164 is shown. This electronic book reader 164 includes a display 165 and an operation section 166. Data that is played back by the electronic book reader 164 is stored in the memory device 100. The memory device 100 can be detached from the electronic book reader 164. Data of the memory device 100 can be reproduced on the display 165 by operation of the operation section 166. In this case, a power supply required for operation of the memory device 100 is supplied by a separate system from this electronic book reader 164. That is, the power supply used to manage stored data of the memory device 100 shown in FIG. 1, FIG. 2, and FIG. 3 is provided in the memory device 100 as an independent power supply. For this reason, stored data of the memory device 100 becomes able to be managed independently from the electronic book reader 164.

As shown in the present embodiment, for electronic devices that provide audio and image data and the like to a user, the memory device 100 can be used to manage this data. An example of this mode will be explained with reference to FIG. 13.

Figure 13:
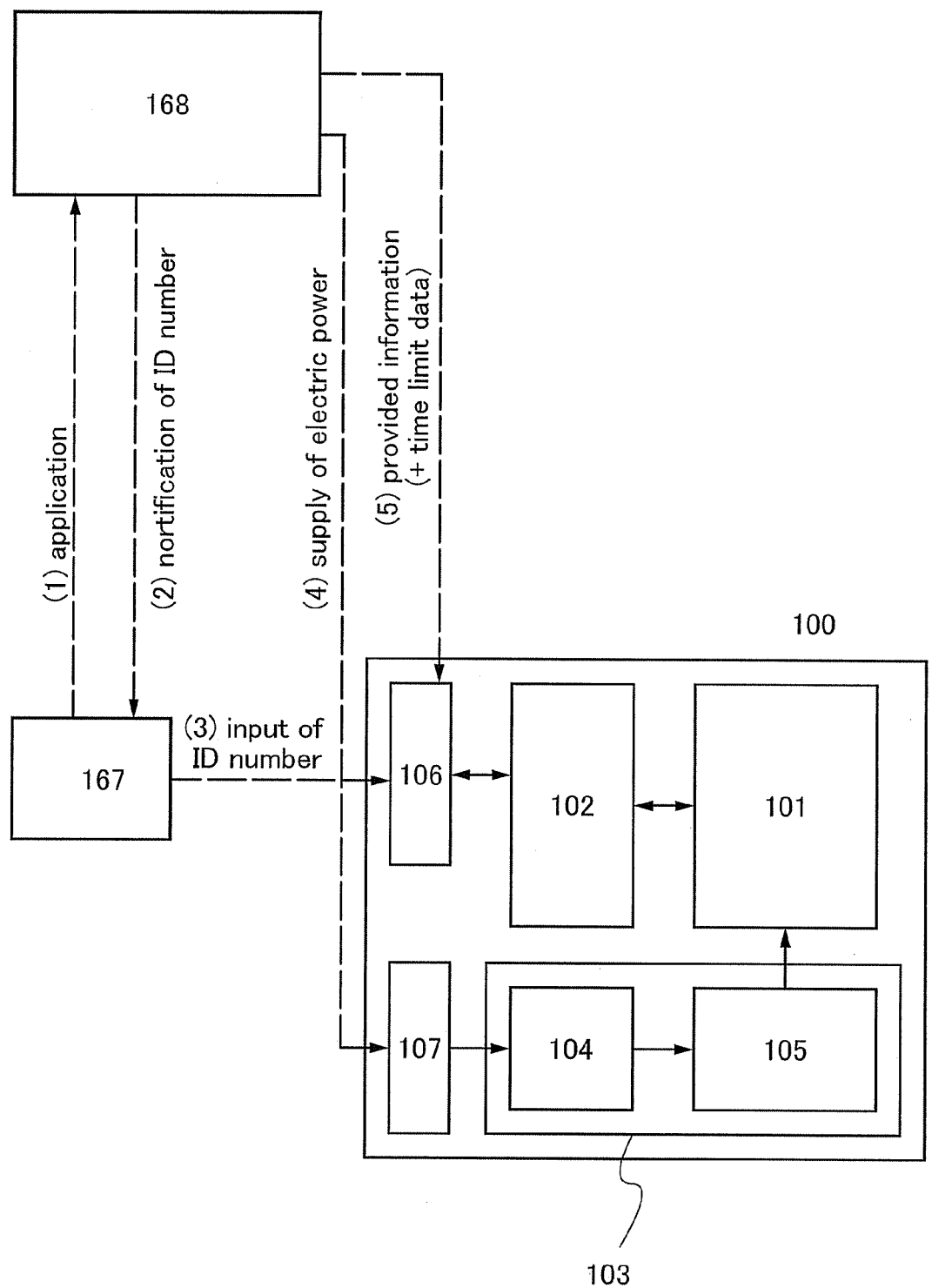
FIG. 13 is a diagram used to describe an information providing system that is shown as an example in Embodiment 2.

In FIG. 13, an information provision system is shown, and the relationship between a user of the memory device 100 and an information provider 168 is shown. When a user 167 wants to receive certain specified information, the user 167 informs the information provider 168 of that fact by application. In this case, a contract outlining conditions such as management of individual information, payment of user fees, and the like is concluded between the user 167 and the information provider 168. The information provider provides notification of an ID number and the like, identifies the user 167, and provides information to accommodate the user 167. The user 167 inputs the ID number into a memory device using an electronic device such as a cellular phone, a digital player, an electronic book reader, or the like. The information provider 168 stores the requested information in the memory device and supplies electric power used to retain that information (used to operate the memory device 100). For example, using a wireless communication unit, the information provider 168 sends provided information to the input/output 106 of the memory device 100 and sends electric power used to charge the accumulator 105 to the input/output 107. Because the length of time during which the information provided to the user 167 can be used can be managed by electric power used for charging supplied by the information provider 168, an increase in profits can be obtained by the information provider 168. Furthermore, for the user, as well, because there is no concern that information used personally will be accumulated and a history of information used be left remaining in the memory circuit 100, privacy of the user can be protected.

This application is based on Japanese Patent Application serial No. 2007-045323 filed in Japan Patent Office on Feb. 26th, 2007, the entire contents of which are hereby incorporated by reference.

What is claimed is:

1. A memory device comprising:
a recording medium including a memory in at least a part thereof;
a recording media controller electrically connected to the recording medium and configured to control operations of writing of data to the memory, reading out of data from the memory, and erasing of data of the memory;
an accumulator electrically connected to the recording medium and configured to supply a first electric power to the recording medium;
a charging circuit electrically connected to the accumulator;
a memory unit storing an identification information and data about a length of time during which the charging circuit operates;
an authenticator electrically connected to the charging circuit and the memory unit and configured to be input a personal identification information;
a first input/output portion electrically connected to the recording media controller and configured to receive data written to the recording medium and to send data stored in the recording medium; and
a second input/output portion electrically connected to the charging circuit and configured to receive a second electric power used for charging the accumulator to supply the first electric power,
wherein the memory device is configured to perform the operations of writing of data to the memory, reading out of data from the memory, and erasing of data of the memory by using the accumulator as sole source of power,
wherein the authenticator is configured to compare the identification information and the personal identification information and to make an authorization to charge the accumulator when the identification information and the personal identification information correspond to each other, and
wherein the charging circuit is configured to perform charging of the accumulator during the length of time when the authorization of the authenticator is obtained.

2. The memory device according to claim 1,
wherein the authenticator is electrically connected to the recording media controller; and
wherein the personal identification information is output from the recording media controller to the authenticator.

3. The memory device according to claim 1,
wherein the personal identification information is a personal identification number.

4. The memory device according to claim 1, further comprising a sensor section comprising a fingerprint sensor, a retina sensor, or a facial image sensor,
wherein the personal identification information is a signal input to the authenticator from the sensor section.

5. The memory device according to claim 1, further comprising an antenna in the second input/output portion, the antenna configured to receive the second electric power from electromagnetic waves.

6. The memory device according to claim 5,
wherein a frequency band of the electromagnetic waves is from 30 kHz to 30 GHz.

7. An electronic device comprising the memory device according to claim 1,
wherein the memory device is removable.

8. A memory device comprising:
a recording medium including a nonvolatile memory;
a recording media controller electrically connected to the recording medium and configured to control operations of writing of data to the recording medium, reading out of data from the recording medium, and erasing of data of the recording medium;
an accumulator electrically connected to the recording medium and configured to supply a driving electric power to the recording media controller;
a charging circuit electrically connected to the accumulator;
a memory unit storing an identification information and data about a length of time during which the charging circuit operates;
an authenticator electrically connected to the charging circuit and the memory unit and configured to be input a personal identification information;
a first input/output portion electrically connected to the recording media controller and configured to receive data written to the recording medium and to send data stored in the recording medium; and
a second input/output portion electrically connected to the charging circuit and configured to receive an electric power used for charging the accumulator to supply the driving electric power,
wherein the recording media controller is configured control the operations of writing of data to the recording medium, reading out of data from the recording medium, and erasing of data of the recording medium by using the accumulator as sole source of power,
wherein the authenticator is configured to compare the identification information and the personal identification information and to make an authorization to charge the accumulator when the identification information and the personal identification information correspond to each other, and
wherein the charging circuit is configured to perform charging of the accumulator during the length of time when the authorization of the authenticator is obtained.

9. The memory device according to claim 8,
wherein the authenticator is electrically connected to the recording media controller; and
wherein the personal identification information is output from the recording media controller to the authenticator.

10. The memory device according to claim 8,
wherein the personal identification information is a personal identification number.

11. The memory device according to claim 8, further comprising a sensor section comprising a fingerprint sensor, a retina sensor, or a facial image sensor,
wherein the personal identification information is a signal input to the authenticator from the sensor section.

12. The memory device according to claim 8, further comprising an antenna in the second input/output portion, the antenna configured to receive the electric power from electromagnetic waves.

13. The memory device according to claim 12,
wherein a frequency band of the electromagnetic waves is from 30 kHz to 30 GHz.

14. An electronic device comprising the memory device according to claim 8,
wherein the memory device is removable.

15. A memory device comprising:
a recording medium including a volatile memory and an auxiliary power supply;

a recording media controller electrically connected to the recording medium and configured to control operations of writing of data to the volatile memory, reading out of data from the volatile memory, and erasing of data of the volatile memory;

an accumulator electrically connected to the auxiliary power supply and configured to supply a first electric power to the auxiliary power supply to retain data that is recorded in the volatile memory;

a charging circuit electrically connected to the accumulator, a memory unit storing an identification information and data about a length of time during which the charging circuit operates;

an authenticator electrically connected to the charging circuit and the memory unit and configured to be input a personal identification information;

a first input/output portion electrically connected to the recording media controller and configured to receive data written to the recording medium and to send data stored in the recording medium; and a second input/output portion electrically connected to the charging circuit and configured to receive a second electric power used for charging the accumulator to supply the first electric power, wherein the memory device is configured to perform the operations of writing of data to the memory, reading out of data from the volatile memory, and erasing of data of the volatile memory by using the accumulator as sole source of power, wherein the authenticator is configured to compare the identification information and the personal identification information and to make an authorization to charge the accumulator when the identification information and the personal identification information correspond to each other, and wherein the charging circuit is configured to perform charging of the accumulator during the length of time when the authorization of the authenticator is obtained.

16. The memory device according to claim 15,
wherein the authenticator is electrically connected to the recording media controller; and
wherein the personal identification information is output from the recording media controller to the authenticator.

17. The memory device according to claim 15,
wherein the personal identification information is a personal identification number.

18. The memory device according to claim 15, further comprising a sensor section comprising a fingerprint sensor, a retina sensor, or a facial image sensor,
wherein the personal identification information is a signal input to the authenticator from the sensor section.

19. The memory device according to claim 15, further comprising an antenna in the second input/output portion, the antenna configured to receive the second electric power from electromagnetic waves.

20. The memory device according to claim 19,
wherein a frequency band of the electromagnetic waves is from 30 kHz to 30 GHz.

21. An electronic device comprising the memory device according to claim 15,
wherein the memory device is removable.

22. A memory device adapted to be removably applied to an electronic device, the memory device comprising:
a recording medium;
a recording media controller electrically connected to the recording medium;
an accumulator electrically connected to the recording medium and configured to supply a first electric power to the recording medium;
a charging controller electrically connected to the accumulator;
a first input/output portion electrically connected to the recording media controller and configured to receive data written to the recording medium and to send data stored in the recording medium; and
a second input/output portion electrically connected to the charging controller and configured to receive a second electric power used for charging the accumulator to supply the first electric power,
wherein the charging controller comprises a charging circuit electrically connected to the accumulator, an authenticator electrically connected to the charging circuit, and a memory unit electrically connected to the authenticator,
wherein the memory unit stores an identification information and data about a length of time during which the charging circuit operates,
wherein the authenticator is configured to compare the identification information and an personal identification information and to make an authorization to charge the accumulator when the identification information and the personal identification information correspond to each other,
wherein the charging circuit is configured to perform charging of the accumulator during the length of time when the authorization of the authenticator is obtained, and
wherein the memory device is configured to function by using the accumulator as sole source of power.

23. The memory device according to claim 22,
wherein the authenticator is electrically connected to the recording media controller; and
wherein the personal identification information is output from the recording media controller to the authenticator.

24. The memory device according to claim 22,
wherein the personal identification information is a personal identification number.

25. The memory device according to claim 22, further comprising a sensor section comprising a fingerprint sensor, a retina sensor, or a facial image sensor,
wherein the personal identification information is a signal input to the authenticator from the sensor section.

26. The memory device according to claim 22, further comprising an antenna configured to receive electromagnetic waves used to perform charging of the charging circuit.

27. The memory device according to claim 26,
wherein a frequency band of the electromagnetic waves is from 30 kHz to 30 GHz.

28. An electronic device comprising the memory device according to claim 22,
wherein the memory device is removable.

* * * * *